(12) United States Patent
Andrews

(10) Patent No.: US 9,028,580 B1
(45) Date of Patent: May 12, 2015

(54) METHODS FOR PROCESSING HUMAN WASTE

(71) Applicant: William L. Andrews, Tappahannock, VA (US)

(72) Inventor: William L. Andrews, Tappahannock, VA (US)

( * ) Notice: Subject to any disclaimer, the term of this patent is extended or adjusted under 35 U.S.C. 154(b) by 0 days.

(21) Appl. No.: 14/193,325

(22) Filed: Feb. 28, 2014

(51) Int. Cl.
| | |
|---|---|
| C02F 11/12 | (2006.01) |
| C05F 3/00 | (2006.01) |
| C05F 7/00 | (2006.01) |
| C05C 9/00 | (2006.01) |

(52) U.S. Cl.
CPC ... *C05C 9/00* (2013.01); *C05F 7/00* (2013.01); *C02F 11/121* (2013.01); *C05F 3/00* (2013.01); *C02F 11/12* (2013.01)

(58) Field of Classification Search
None
See application file for complete search history.

(56) References Cited

U.S. PATENT DOCUMENTS

| | | | | | |
|---|---|---|---|---|---|
| 4,098,006 | A | * | 7/1978 | Maffet | 34/389 |
| 4,099,336 | A | * | 7/1978 | Maffet | 34/389 |
| 4,128,946 | A | * | 12/1978 | Maffet | 34/386 |
| 4,191,643 | A | * | 3/1980 | Kneer | 210/609 |
| 4,193,206 | A | * | 3/1980 | Maffet | 34/385 |
| 4,659,472 | A | * | 4/1987 | Nordlund et al. | 210/609 |
| 4,880,586 | A | * | 11/1989 | Baader | 264/141 |
| 5,429,750 | A | * | 7/1995 | Steele | 405/129.25 |
| 5,772,721 | A | * | 6/1998 | Kazemzadeh | 71/11 |
| 6,174,472 | B1 | * | 1/2001 | Johnson et al. | 264/118 |
| 7,882,646 | B2 | * | 2/2011 | Gorbell et al. | 34/514 |
| 2004/0185148 | A1 | | 9/2004 | Said | |
| 2004/0187534 | A1 | * | 9/2004 | Genier | 71/11 |
| 2010/0139346 | A1 | * | 6/2010 | Burnham | 71/12 |
| 2011/0160058 | A1 | * | 6/2011 | Fedkenheuer et al. | 504/101 |
| 2011/0247378 | A1 | * | 10/2011 | Begley et al. | 71/8 |
| 2014/0137614 | A1 | * | 5/2014 | Burnham et al. | 71/8 |

FOREIGN PATENT DOCUMENTS

| | | | |
|---|---|---|---|
| CN | 102476905 | * | 5/2012 |
| JP | 9-110566 | * | 4/1997 |

OTHER PUBLICATIONS

Brosto, Witold et al., "Polymeric Flocculants for Wastewater and Industrial Effluent Treatment", Journal of Materials Education vol. 31 (3-4): 157-166 (2009).

\* cited by examiner

*Primary Examiner* — Wayne Langel
(74) *Attorney, Agent, or Firm* — McGuireWoods LLP

(57) ABSTRACT

Methods are provided for processing municipal human waste such that the processed material is is greater than 99% free of pathogenic organisms. The processed material can be used as an organic fertilizer or a "Class A" organic fertilizer. The methods include reducing the moisture content of human sludge free of polymeric flocculant to less than about 30% moisture and processing the sludge through an extruder under conditions having a minimum temperature of about 140° C., a residence time of about 30 seconds, and an atmospheric pressure differential of about 40 atmospheres. The methods are economical and have numerous advantages including reduced use of fossil fuel, fast processing time, and production of an odor free organic fertilizer free of many land use restrictions.

17 Claims, 1 Drawing Sheet

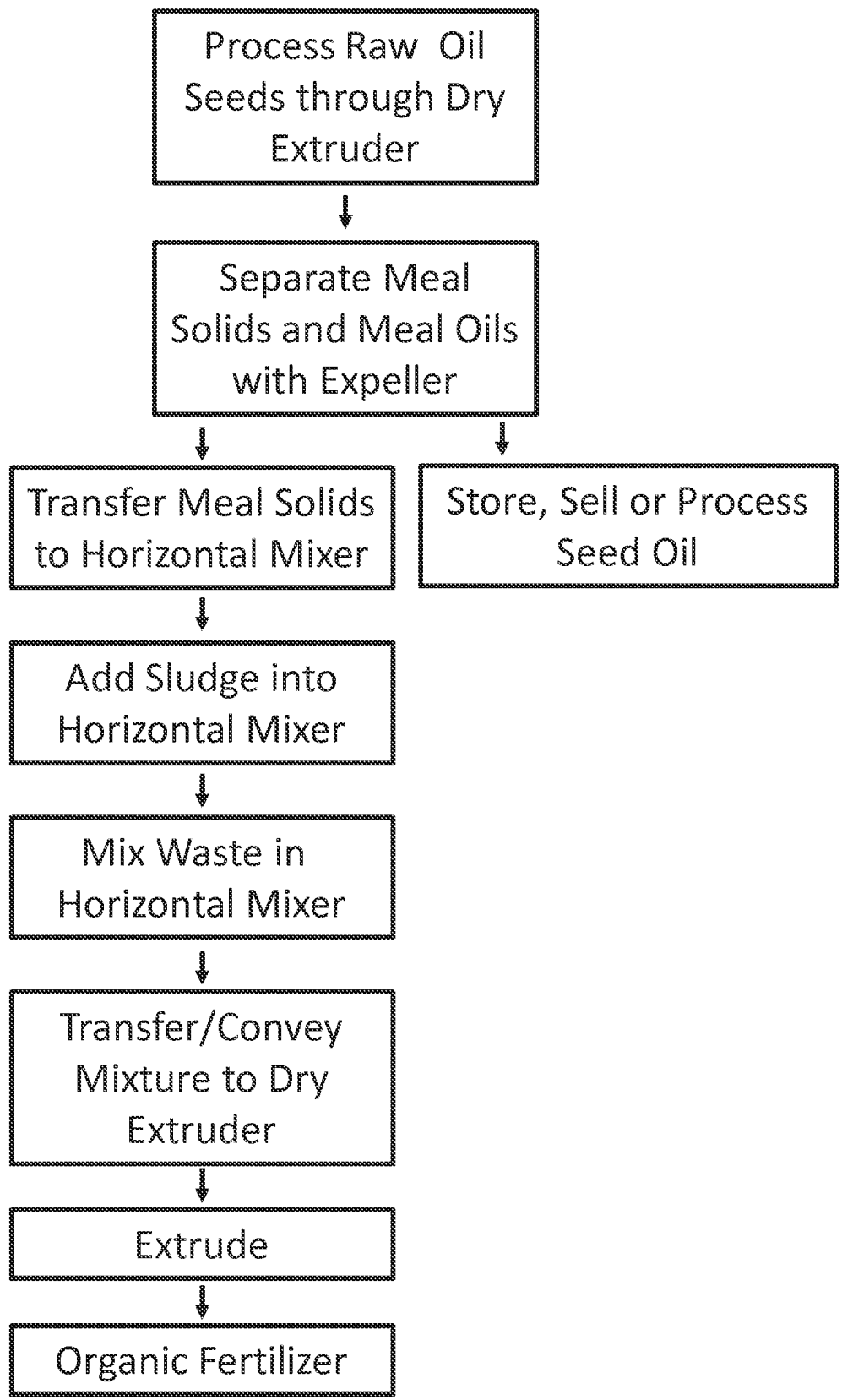

METHODS FOR PROCESSING HUMAN WASTE

TECHNICAL FIELD

The presently disclosed subject matter relates to methods for processing human waste. Specifically, the methods for processing human waste significantly reduce the pathogen levels of the waste, are cost effective, and do not create additional environmental problems.

BACKGROUND

Throughout the United States, especially in the major urban centers, human municipal waste is growing. While the amount of this sludge waste is growing exponentially, the currently approved options for safe disposal of the waste are shrinking. Because pathogenic microorganisms associated with sludge solids can have a prolonged infectious activity, municipal sewage can be a source of microbial pollution in runoff water when sewage sludge is applied to farm lands or landfills without being first sterilized. Further, each of the currently approved options for disposal of this waste is associated with significant drawbacks including expense and environmental concerns.

For example, dumping the human waste into landfills, which was never a desireable option, is becoming even less so as the landfills reach capacity and new locations become increasingly difficult to find. Dumping the waste into the oceans just shifts the environmental problem from one eco-system to another. This method is a form of "looking the other way" as nothing is done to insure that the pathogens in the sludge do not harm the living organisms in the sea.

Burning the waste kills the pathogens and reduces the volume of the waste. The end product of this method is a low analysis "Class A" fertilizer under EPA Rule 503, but it has two major problems. First, the burning process requires large quantities of expensive petroleum to dewater and burn the sludge. As the cost of fossil fuel increases, this method of disposal becomes more and more expensive. Second, the burning process puts carbon and carbon dioxide into the atmosphere, causing other environmental problems.

Composting is another method for disposal of the waste, however, even properly composted sludge has very low plant nutrient value (especially the primary nutrients: nitrogen, phosphorous and potassium). As a result, application of large amounts of compost is necessary and additional nutrients must be furnished to achieve desireable plant growth. Other disadvantages of composting include long processing times (a minimum of 30 to 45 days, weather permitting). The composting process requires turning or stirring and a large land area with an impervious base to prevent vertical leaching. Both horizontal and vertical leaching of nutrients from the compost pile can create additional environmental issues. Further, the smell that is emitted from the pile is highly objectionable to neighboring localities.

In order to apply the sludge direactly to farm land, the sludge must first be stabilized. In one method, high calcium lime and polymeric flocculants are blended into the raw sludge before it is delivered. The raising of the pH by blending in the high calcium lime stabilizes the sludge creating an EPA Rule 503 "Class B" fertilizer. This process reduces the pathogen level in the sludge blend to 90-94% pathogen free. However, the process is expensive and does little to neutralize the ammonia smell odor. The odor is one of the highest sources of complaints and also severly restricts the options for land application due to EPA and State Environmental Agency restrictions based on public health concerns. Land use restrictions include prevention of application of the stabilized sludge to frozen ground. Futher, the farm land once available for lime stabilized sludge operators is increasingly scarce due to urban sprawl.

There are numerous pathogenic microorganisms associated with human sludge which can be a cause of major health concerns. For example, the microorganisms associated with human municipal waste include fecal coliforms, *Salmonella* species, enteric viruses, and Helminth ova. Some of these microorganisms can pose serious health issues. Members of two bacteria groups, coliforms and fecal streptococci (fecal coliforms), are used as indicators of possible sewage contamination because they are commonly found in human and animal feces. Although they are generally not harmful themselves, they indicate the possible presence of pathogenic (disease-causing) bacteria, viruses, and protozoans that also live in human and animal digestive systems. Therefore, their presence suggests that pathogenic microorganisms might also be present. Since it is difficult, time-consuming, and expensive to test directly for the presence of a large variety of pathogens, water is usually tested for coliforms and fecal streptococci instead. Sources of fecal contamination to surface waters include wastewater treatment plants, on-site septic systems, domestic and wild animal manure, and storm runoff.

*Salmonella* species are pathogenic bacteria often detected in sewage sludge. *Salmonella* spp. can survive for long periods in natural waters, and the persistence of specific and epidemic strains is of great concern in public health. *Salmonella* spp. are ubiquitous enteric bacteria and one of the most common causes of foodborne disease worldwide. These gram-negative rods are the etiologic agents of food-borne salmonellosis and also the agents that cause typhoid and paratyphoid fevers.

Human enteric viruses (i.e., viruses that are transmitted via the fecal-oral tract) consist of more than 100 virus types, with hepatitis A virus and Norwalk virus being the primary human viral pathogens of concern. Human enteric viruses are obligate parasites of man that infect and replicate in the gastrointestinal tract of their hosts. Patients suffering from viral gastroenteritis or viral hepatitis may excrete about $10^5$ to $10^{11}$ virus particles per gram of stool, comprising various genera such as adenoviruses, astroviruses, noroviruses, Hepatitis E virus, parvoviruses, enteroviruses (Coxsackie viruses, echoviruses and polioviruses), Hepatitis A virus, and the rotaviruses. Human enteric viruses are causative agents of many non-bacterial gastrointestinal tract infections, respiratory infections, conjunctivitis, hepatitis and other serious infections such as meningitis, encephalitis and paralysis. Most cases of enteric virus infections have been observed to originate from contaminated drinking water sources, recreational waters and foods contaminated by sewage and sewage effluents waters. Wastewater treatment processes such as the activated sludge process, oxidation ponds, activated carbon treatment, filtration, and lime coagulation and chlorination only eliminate between 50% and 90% of viruses present in wastewater, allowing for a significant viral load to be released in effluent discharge. Due to their stability and persistence, enteric viruses subsequently become pollutants in environmental waters resulting in human exposure through pollution of drinking water sources and recreational waters, as well as foods.

Helminth eggs are the infective agents for the types of worm diseases known globally as helminthiases. Although helminths are pluricellular animals their eggs are microscopic (around 20 to 80 μm for those that are important in the sanitary field) and are contained in variable amounts in wastewater, sludge and excreta. Helminth eggs can infect humans through the ingestion of food crops polluted with wastewater sludge or excreta. Due to different health conditions in different countries the type of helminth eggs and their content in wastewater and sludge also varies. *Ascaris* eggs are the most common and ascariasis is the most common helminthiasis disease worldwide. The content of the other types of helminth eggs in wastewater determines the local patterns of disease.

Accordingly, there is an unmet need for cost effective methods of processing human waste that significantly reduce the pathogen levels of the waste such that restrictions on land application of the processed waste can be lifted and no additional environmental problems are created. The present disclosure provides such improved methods.

SUMMARY

In one embodiment of the presently disclosed subject matter, a method is provided for processing human waste, the method comprising: reducing the moisture content of human sludge derived from human waste to a percent moisture content of less than about 30%, wherein the human sludge is free of added polymeric flocculant, and processing the sludge through an extruder under conditions comprising a minimum temperature of about 140° C., a residence time of about 30 seconds, and an atmospheric pressure differential of about 40 atmospheres, wherein the extruded material is is 99% free of pathogenic organisms.

BRIEF DESCRIPTION OF THE DRAWINGS

FIG. 1 is a flow diagram depicting a method for processing human waste according to one or more embodiments of the presently disclosed subject matter.

DETAILED DESCRIPTION

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

The presently disclosed subject matter provides methods for processing human waste such that the biohazardous municipal sludge can be converted into a biologically safe material that can be used as an organic fertilizer. An environmental hazard can be converted into an environmentally friendly soil enhancer. The processes described herein requires the use of significantly less fossil fuel than other currently available processes for stabilizing human waste. The advantages of the methods of the present disclosure include that the resulting organic fertilizer can be greater than 99% pathogen free. Further advantages include that the methods disclosed herein and resulting fertilizer product are free of offensive odors commonly associated with currently available methods for processing human waste.

A Class A fertilizer produced according to the processes described herein can be applied to land free of many of the restrictions associated with currently available processing methods such as a prohibition on application to frozen land. Thus, fertilizer produced according to the methods of the present disclosure can be applied as a land application fertilizer to farm fields, golf courses, parks, lawns, family gardens, forest lands, and orchards and it can be shipped without the burdensome hazard material designation. Further, the organic fertilizer disclosed herein can have a higher nitrogen content than organic fertilizer produced using other methods from human sludge treated with polymeric flocculants. Thus, organic fertilizer produced according to the process of the present disclosure has added advantages in that it may not require addition of supplemental nitrogen-containing fertilizers.

Another advantage is that fertilizer produced according to the presently disclosed methods can be manufactured to meet each end user's nutritional specifications. In contrast to exiting methods for production of non-organic fertilizer, the methods of the present disclosure do not require mining of non-renewable resources.

In one embodiment of the presently disclosed subject matter, a method is provided for processing human waste, the method comprising: reducing the moisture content of human sludge derived from human waste to a percent moisture content of less than about 30%, wherein the human sludge is free of added polymeric flocculant, and processing the sludge through an extruder under conditions comprising a minimum temperature of about 140° C., a residence time of about 30 seconds, and an atmospheric pressure differential of about 40 atmospheres, wherein the extruded material is is 99% free of pathogenic organisms. In the method for processing human waste, the human waste can be municipal human sludge. In the method for processing human waste, the percent moisture content can be less than about 25%.

In one embodiment, an organic fertilizer is provided that is produced according to a process comprising: dewatering human sludge derived from human municipal waste to a percent moisture content of less than about 30%, wherein the human sludge is free of added polymeric flocculant; and processing the sludge through an extruder under conditions comprising a minimum temperature of about 140° C., a residence time of about 30 seconds, and an atmospheric pressure differential of about 40 atmospheres, wherein the extruded material is an organic fertilizer 99% free of pathogenic organisms and having an increased content of nitrogen (N) as compared to organic fertilizer produced from human sludge treated with polymeric flocculants. The human sludge can be dewatered to a percent moisture content of less than about 25%.

In the methods of the present disclosure, the extruded material can be 99.9% free of pathogenic organisms. The extruded material can be 99.99% free of pathogenic organisms. The extruded material can be used as an organic fertilizer. The organic fertilizer can be a class A fertilizer.

The pathogenic organisms can include, but are not limited to, bacteria, fecal coliform, *Salmonella* species, enteric viruses, and Helminth eggs.

Reducing the moisture can include dewatering the sludge. Dewatering the sludge can include use of a mechanical separator, a thermal dryer, or a turbulent dryer.

Reducing the moisture can include mixing the sludge with biodegradable material that has a moisture content below about 15%. The biodegradable material can have a moisture content between about 10% and 15% or the moisture content of the biodegradable material can be about 10% or below. The biodegradable material can be any type of biodradable material having a moisture content below about 15% and can include but is not limited to, for example, one or more of chicken litter, plant material, crop waste, tree bark, saw dust, grass clippings, leaves, hay, wheat straw, barley straw, corn stover, milo, processed sugarcane, rice hulls, peanut hulls, sorghum, pearl millet, orange peel, orange pulp, soybean, peanut, oil seed meal, soybean meal, canola meal, peanut meal, palm berry meal, and sunflower meal. In the method for processing human waste, reducing the moisture can include both dewatering the sludge and mixing the sludge with the biodegradable material.

In the method for processing human waste, the particle size of the biodegradeble material can be reduced to a range from about 1500 to about 1000 microns prior to mixing with the sludge. The particle size of the biodegradable material can be reduced using a hammer mill.

The type and amount of the biodegradable material used can be chosen based on the moisture content of the sludge and the biodegradable material as well as the type of extruded material that is desired. In the method for processing human waste, reducing the moisture content can comprise mixing the sludge with about 4 parts biodegradable material to about 1 part sludge. Reducing the moisture content can comprise a combination of dewatering the sludge and mixing the sludge with about 3 parts biodegradable material to about 1 part sludge. Reducing the moisture content can comprise a combination of dewatering the sludge and mixing the sludge with about 2 parts biodegradable material to about 1 part sludge. Reducing the moisture content can comprise a combination of dewatering the sludge and mixing the sludge with about 1 part biodegradable material to about 1 part sludge. The biodegradable material can comprise oil seed meal.

In the method for processing human waste, the extruded material can be an organic fertilizer, and the type of the biodegradable material can be chosen based on the desired formula of the fertilizer. For example, use of rice hulls as the biodegradable material will reduce each of nitrogen, phosphate, and potassium levels in the extruded material. In contrast, use of soybeen, sugarcane, or biodegradable material derived from trees will increase the amout of potassium in the extruded material. In this manner, the methods of the present disclosure allow for production of fertilizers with specific formulas. In another embodiment, urea can be added directly to the extruded material resulting from the process to increase the nitrogen content of the extruded material.

The following examples are offered by way of illustration and not by way of limitation.

EXAMPLES

Example 1

Production of Class a Fertilizer from Human Waste

Human waste was processed according to the following process and the resulting material is tested for levels of pathogenic microorganisms.

First, raw oil seeds such as soybeans, canola, peanuts, palm berries, and sunflowers were processed through a dedicated dry extruder. The extruded oil seed meal was processed through an expeller (i.e., a continuous horizontal press) to remove 92% to 94% of the oil from the seed meal. At this point the seed meal had a moisture content of less than 15% and was used as "dry" biodegradable material to mix with the human waste to be processed as described below.

Several United States municipalities were chosen as sites for collection of human waste samples for the study. Three composite samples of municipal sludge were collected by drawning samples into sealable sterile containers at each site. One of the samples was cake sludge that had been treated with polymeric flocculant, one of the samples was cake sludge that had been treated with polymeric flocculant and lime, and one of the samples was liquid sludge from a lagoon which was free of polymeric flocculant. The biosolids from the liquid sample were allowed to settle to the bottom of the collection container and excess water was siphoned off without removing the settled solids. After removal of excess water, each sample was at least 100 lbs. Each sample was divided into equal batches for processing with and without addition of dry biodegradable material and with and without processing through an extruder.

The seed meal processed as described above was transferred via an auger into a horizontal mixer. The human municipal sludge samples described above were separately augured into the horizontal mixer and mixed to homogeneity with the seed meal at a ratio of about 4:1 soybean seed meal to human mumicipal sludge. The homogenous mixture was discharged directly into a dry extruder dedicated for waste (this step was performed for each of the samples designated for the extruding process). The mixture was processed through the extruder under conditions of a minimum temperature of 140° C., a residence/dwell time of approximately 30 seconds, and an atmospheric pressure differential of approximately 40 atmospheres as the mixture exited the extruder.

Results:

A problem occurred in the case of the samples that contained polymeric flocculant. When these samples were processed through the extruder, a sticky material collected on the extruder which interfered with the extruding process. The stickty material was attributed to the presence of the polymeric flocculant. The collection of the sticky material on the extruder occurred with the polymeric flocculant-containing samples whether or not the samples also contained the added dry biodegradable material.

Microscopic analysis was performed on all of the samples. Microscopic analysis of all the samples that were not processed through the extruder showed mold and bacteria growing profusely. Microscopic analysis of the samples which contained polymeric flocculant and were processed through the extruder also showed mold and bacteria growing profusely. In contrast, the samples that did not contain polymeric flocculant and which were processed through the extruder were free of mold and bacteria. No pathogens were detected in the microscopic analysis of the polymer free samples that were processed through the extruder. In contrast, the same analysis conducted on the polymer free sample that was not processed through the extruder revealed fecal coliform and *Salmonella* spp.

In addition to microscopic analysis, microbial testing of the samples for level of pathogens can be conducted by an independent laboratory using accepted EPA methods as described below.

Fecal Coliforms.

Method 1680 is used to test for fecal coliforms in the samples by multiple-tube fermentation using Lauryl Tryptose Broth (LTB) and EC Medium. A negative fecal coloform result is reported if the density of fecal coliform in the sample is less than 1000 Most Probable Number (MPN) of total solids on a dry weight basis. All negative LTB tubes are re-incubated for 24 hours and reassessed. A negative result is reported after the second incubation fails to produce gas in LTB medium within 48±3 hours.

*Salmonella* spp.

The modified semisolid Rappaport-Vassililidis (MSRV) medium protocol presented in Method 1682 is used to provide enumeration of *Salmonella* species based on the most probable number (MPN) technique. The determination of *Salmonella* species with this method involves inoculating enrichment medium, tryptic soy broth (TSB), with a measured amount of sample and incubating for 24 hours. Presumptively identified colonies are isolated on xylose-lysine desoxycholate agar (XLD), and confirmed using triple sugar iron test (TSI), followed by positive serological typing using polyvalent antisera. A total solids (% dry weight) determination is performed on a representative biosolids sample and is used to calculate MPN/g dry weight. *Salmonella* density is reported as MPN/4 g dry weight and a negative *Salmonella* spp. result is reported if the density of *Salmonella* ssp. bacteria in the sample is less than 3 MPN/4 g of total solids.

Human Enteric Viruses.

The Freon elution method is used to quantify the presence of enteric viruses. A 10% beef extract solution is also used for eluent, organic flocculation for the virus concentration, and the plaque assay using BGM cell line for quantitative virus detection. A negative enteric virus result is reported if the density of enteric virus in the sample is less than 1 Plaque-Forming Unit (PFU) per 4 grams of total solids.

Viable Helminth Ova.

Viable Helminth ova is quantified by looking for the presence of *Ascaris* ssp., *Toxocara, Trichuris, Hymenolepis* and human and animal hook worms. A negative Helminth ova result is reported if the density of viable Helminth eggs is less than one egg per four grams of total solids, all counts being expressed on a dry weight basis. Crystal violet is used as a presumptive vital staining method in the assessment of viable Helminth ova.

One skilled in the art will readily appreciate that the presently disclosed subject matter is well adapted to carry out the objects and obtain the ends and advantages mentioned, as well as those inherent therein. The present examples along with the methods described herein are presently representative of preferred embodiments, are exemplary, and are not intended as limitations on the scope of the invention. Changes therein and other uses will occur to those skilled in the art which are encompassed within the spirit of the invention as defined by the scope of the claims.

I claim:

1. A method for processing human municipal waste, the method comprising:
    reducing the moisture content of human sludge derived from human municipal waste to a percent moisture content of less than 30%, wherein the human sludge is free of added polymeric flocculant; and
    processing the sludge through an extruder under conditions comprising a minimum temperature of about 140° C., a residence time of about 30 seconds, and an atmospheric pressure differential of about 40 atmospheres, wherein the extruded material is 99% free of pathogenic organisms.

2. The method of claim 1, wherein the extruded material is 99.9% free of pathogenic organisms.

3. The method of claim 1, wherein the extruded material is 99.99% free of pathogenic organisms.

4. The method of claim 1, wherein the pathogenic organisms comprise bacteria, fecal coliform, *Salmonella* species, enteric viruses, or Helminth eggs.

5. The method of claim 1, wherein the extruded material is an organic fertilizer.

6. The method of claim 1, wherein the extruded material is a "Class A" organic fertilizer.

7. The method of claim 1, wherein the percent moisture content is less than about 25%.

8. The method of claim 1, wherein reducing the moisture content comprises one or both of dewatering the sludge or mixing the sludge with biodegradable material, wherein the biodegradable material has a moisture content below about 15%.

9. The method of claim 8, wherein the biodegradable material comprises chicken litter, plant material, crop waste, tree bark, saw dust, grass clippings, leaves, hay, wheat straw, barley straw, corn stover, milo, processed sugarcane, rice hulls, peanut hulls, sorghum, pearl millet, orange peel, orange pulp, soybean, peanut, oil seed meal, soybean meal, canola meal, peanut meal, palm berry meal, or sunflower meal, or combinations thereof.

10. The method of claim 8, wherein reducing the moisture content comprises mixing the sludge with about 4 parts biodegradable material to about 1 part sludge.

11. The method of claim 8, wherein reducing the moisture content comprises mixing the sludge with about 3 parts biodegradable material to about 1 part sludge.

12. The method of claim 8, wherein reducing the moisture content comprises mixing the sludge with about 2 parts biodegradable material to about 1 part sludge.

13. The method of claim 8, wherein reducing the moisture content comprises mixing the sludge with about 1 part biodegradable material to about 1 part sludge.

14. The method of claim 8, wherein the biodegradable material comprises oil seed meal.

15. The method of claim 1, wherein urea is added to the extruded material to increase nitrogen content.

16. The method of claim 8, further comprising reducing a particle size of the biodegradable material to a range from about 1500 to about 1000 microns.

17. The method of claim 8, wherein dewatering the sludge is carried out by one or a combination of mechanical separator, a thermal dryer, or a turbulent dryer.

* * * * *